Oct. 9, 1928.
G. E. HAZARD
HOSE COUPLING
Filed June 18, 1925
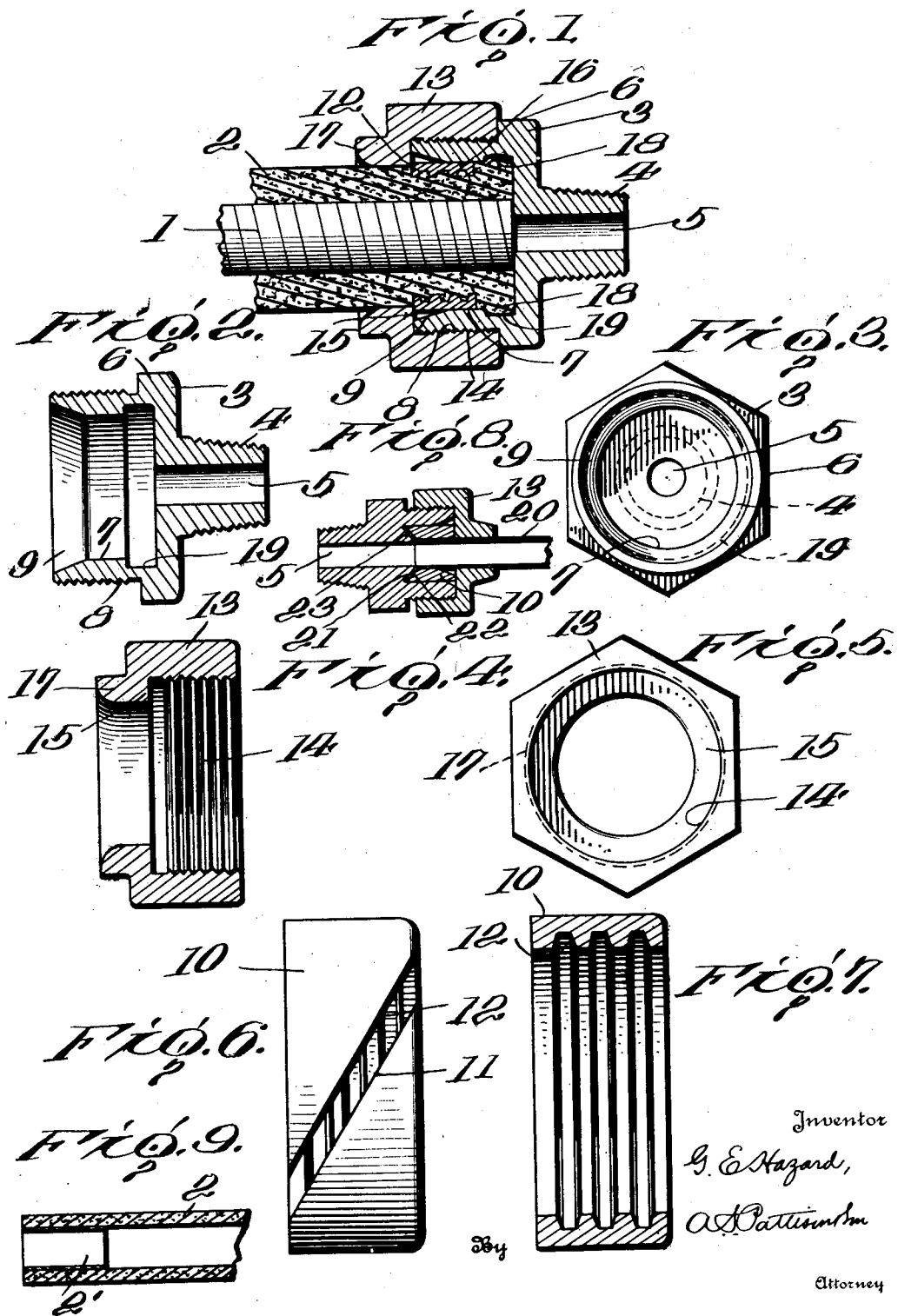
Inventor
G. E. Hazard,
A. S. Pattison
By
Attorney Patented Oct. 9, 1928.

1,687,445

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

HOSE COUPLING.

Application filed June 18, 1925. Serial No. 37,939.

This invention relates to improvements in hose couplings and the idea of the invention is to provide a simple construction whereby an air and liquid tight joint may be made.

A further object of the present invention is to provide an improved hose coupling that is especially made to be used with a rubber covered hose whereby when the parts of the coupling are screwed into position a perfect air and liquid tight joint is accomplished.

Another object of the invention is to provide a hose coupling that is adapted to co-act with the usual rubber covered hose that is used in connection with hydraulic brakes on automobiles, the said coupling being comprised of a body portion, a ring for compressing the rubber, and a nut for forcing the ring into the body portion whereby an air and liquid tight joint is produced.

Further objects will appear hereinafter upon an understanding of the specification and accompanying drawings.

In the accompanying drawings:

Figure 1 is a longitudinal sectional view of the present improvement.

Fig. 2 is a detached sectional view of the body portion.

Fig. 3 is an end view of the body portion.

Fig. 4 is a sectional view of the nut.

Fig. 5 is an end view of the said nut.

Fig. 6 is a side view of the split clamping ring.

Fig. 7 is an enlarged detached sectional view of the split clamping ring.

Figure 8 is a longitudinal view showing the coupling adapted to be used in connection with a metallic pipe.

Figure 9 shows a coupling used by the insertion of a short metallic section in the end of a rubber tube or hose.

Referring now to the drawings, the hose to which the present invention is applied comprises a central metallic portion 1 that has a rubber coating 2. This constitutes a flexible air and liquid tight joint. Preferably the rubber coating 2 is made quite heavy as shown especially when it is adapted for retaining quite heavy pressure such for instance as flexible tubing for hydraulic automobile brakes.

The present invention comprises a coupling which consists of a body portion 3. This body portion has at one end an externally screw threaded projection 4, which is preferably made tapering for the purpose of being screwed tightly into the metallic object to which it is applied. An opening 5 passes through the body portion, and the body portion is made angular as shown at 6 in Fig. 3 whereby a wrench may be applied to it for screwing it tightly in place and for removing it when desired. The body portion is primarily made cup shaped by being provided with a portion 7 projecting from the opposite side to the screw threaded part 4. This projecting portion 7 is somewhat in the nature of an annular flange, and it is externally screw threaded at 8. The ends of this flange are grooved as shown at 9 for the purpose of making the cup shaped portion with an outer enlargement to adapt the parts of the coupling and the hose to be placed therein.

In Figures 6 and 7 are shown views of the split clamping ring 10, the said ring being split to form normally an open space 11 between its ends, while the interior part of the ring preferably has a number of annular grooves or serrations 12.

A clamping member 13 is provided, the said clamping member consisting of a flanged portion provided with an internally screw threaded member 14, its oposite end turned inward forming a shoulder 15 against which the outer end 16 of the split clamping nut engages. Preferably this nut is also provided with a short flange 17 that extends outwardly from the body of the nut as shown.

The foregoing parts are applied to the hose by slipping its end through the nut so that it projects beyond the nut, and the clamping ring then placed on the end of the hose with the end of the hose projecting beyond the clamping ring, a distance of approximately a quarter of an inch or less. This projecting end of the hose is inserted in the flange 7 of the body portion 3 until the end of the nut engages the threads 8. Then the nut is screwed on the flange 8 to the position shown in Figure 1, the said split ring being compressed, which in turn compresses the rubber, and when the parts are in the position shown in Fig. 1 the rubber extends as shown at 18 into an annular groove 19 at the inner end of the flange 7.

By reference to Fig. 1 with the parts in their assembled positions it will be observed that a joint is made that is absolutely air and liquid tight by reason of the compression of the rubber and its extended part 18.

The present coupling can of course be used in other connections than those hereinbefore mentioned, and therefore the present application is not intended to limit the invention in respect to its use. It may be used substantially in any position that ordinary coupling is used, and at the same time make an air and liquid tight joint.

I find that a connection made in the manner herein described makes an absolutely air and liquid tight joint, and from which there will be no escape.

In hose connections for flexible tubings for automobile brakes it has been found that there is frequently leakage of liquid, and when such leakage occurs the efficiency of the brake is very much lessened until finally it is substantially destroyed.

A hose connection as herein shown is especially adapted for tubing in which air and liquid pressure is utilized because it is found that an absolutely air tight connection is provided by it. It is simple in construction and yet exceedingly efficient in operation.

Changes may be made in the construction without departing from the spirit and scope of the present invention so long as the changes are within the scope of the appended claim.

Having thus described my invention what I claim and desire to procure by Letters Patent is:—

A hose coupling comprising a body member having an opening, a rubber hose passing through and fitting the said opening, the body member having an enlarged internally screw-threaded portion forming a space between it and the outer surface of the hose, the hose passing through the body member a distance greater than the length of the internally screw-threaded flange, a clamping member having an externally threaded portion fitting within the internally threaded flange portion, the externally threaded flange member having an opening substantially equal to the diameter of the hose portion, a metallic core for the hose, the externally screw-threaded member having its outer end reduced and abutting against the hose, the outer end of the inner surface of the externally screw-threaded flange portion enlarged outwardly, a clamping ring engaging the said hose, whereby when the clamping member is forced inwardly the extremity of the hose is forced outwardly into the said inner enlarged portion of the externally threaded flange, substantially as described.

In testimony whereof I hereunto affix my signature.

GEORGE EDGAR HAZARD